United States Patent Office 2,872,366
Patented Feb. 3, 1959

2,872,366

METHOD OF LAMINATING VINYL CHLORIDE TO METAL WITH SYNTHETIC RESIN-RUBBER ADHESIVE AND RESULTANT ARTICLE

Conleth E. Kiernan, Naugatuck, and Walter K. Clark, Woodbury, Conn., assignors to United States Rubber Company, New York, N. Y., a corporation of New Jersey No Drawing. Application July 20, 1956
Serial No. 599,010

5 Claims. (Cl. 154—129)

This invention relates to an improved laminate comprising a metal base, particularly electrolytic zinc coated steel, and a plastic coating, particularly a preformed film or sheet of vinyl resin.

U. S. Patent 2,728,703, issued to Kiernan and Fischer on December 27, 1955, discloses a method of continuously hot-laminating a sheet metal base and a preformed film of vinyl resin, to produce a laminate that can be afterformed (e. g., bent, drawn, stamped or crimped) extensively without injury to the vinyl film, and without failure of the adhesive bond between the vinyl film and the metal base. While the process described in that patent has many advantages, it has been desired to improve the resulting laminate in certain respects. Thus, it is found that with the usual adhesive compositions, if it is attempted to continuously hot-laminate preformed vinyl film to a zinc coated metal surface the bond between the vinyl film and the metal is very poor, especially after a period of aging. Accordingly, it is a principal object of the present invention to provide an improved laminate, in which the vinyl film is firmly bonded to the zinc coated metal base, and remains firmly adherent even after extended periods of aging.

The invention accomplishes the foregoing object, as well as additional objects and advantages, by utilizing a novel adhesive composition comprising as its sole essential ingredients (A) a rubbery terpolymer containing combined from about 40% to 80% of butadiene, from about 10% to 50% of acrylonitrile, and from about 2% to 25% of methacrylic acid and (B) a resinous terpolymer of 5% to 20% of vinyl acetate, 80% to 95% of vinyl chloride, and 0.5 to 5% of an alpha, beta-olefinically unsaturated carboxylic acid, such as maleic acid (or its anhydride). The adhesive composition may include curatives for the rubbery terpolymer, such as sulfur or sulfuryielding materials. The proportions of the rubbery terpolymer (A) to resinous copolymer (B) suitably range from 10 to 50 parts of (A) and correspondingly 90 to 50 parts of (B). The ingredients are dissolved or dispersed in a suitable volatile medium, and applied in this form to the surface of the zinc coated metal base or to the preformed vinyl film, in a manner that will be described in detail below. In the rubbery terpolymer (A), some or all of the methacrylic acid may be replaced by acrylic acid. In general, acrylic acid and its homologues and simple substitution products are operable, especially those containing 3 to 5 carbon atoms. These are monocarboxylic acids containing the grouping

Conventional solvents, such as hydrocarbons (e. g., toluene), or ketones (e. g., methyl ethyl ketone, or methyl isobutyl ketone), or the like, may be used to prepare the adhesive solution.

A preferred form of the adhesive composition contains a small amount (i. e., from 2% to 10%, based on the total solids content of the adhesive) of a soluble, heat-reactive phenolic resin, of the type prepared from phenol and formaldehyde by acid catalysis, such as is described, for example, in U. S. Patent 2,203,206 of Shepard et al. The phenolic resin preferably is modified with from 2 to 10% of cashew nut oil. Such resins are capable of being converted into a relatively infusible state by heating in the presence of a curing agent, which is usually a substance capable of yielding formaldehyde, as is well understood by those skilled in the art. As marketed, such resins commonly contain a suitable amount of curing agent, such as hexamethylene tetramine or paraformaldehyde. The phenolic resin is also believed to act as a curing and crosslinking agent for the rubbery terpolymer (A). It is believed that this terpolymer is rendered substantially thermoset and infusible during and subsequent to the laminating cycle.

The rubbery terpolymer of butadiene:acrylonitrile:methacrylic acid may be prepared as described, for example, in U. S. Patent 2,395,017 of Semon, issued February 19, 1946. The disclosure in that patent is hereby incorporated herein by reference.

The vinyl chloride-vinyl acetate copolymer resin modified with a small quantity of an alpha,beta-olefinic unsaturated carboxylic acid may be prepared as disclosed, for example, in U. S. Patent 2,329,456 to Campbell, issued September 14, 1943. The disclosure in that patent is hereby incorporated herein by reference.

The invention has particular reference to the application of a preformed vinyl film to a ferrous metal, especially steel, in sheet form, having an electro galvanized surface, that is, having a coating of electrolytic zinc, as distinguished from a hot-dipped galvanized surface.

The preformed vinyl film which is to be applied to the sheet metal base may be prepared by any conventional method, such as calendering or casting. The film or sheet may be comprised of polyvinyl chloride itself, or it may be a modified vinyl chloride polymer obtained, for example, by copolymerizing vinyl chloride with a copolymerizable material such as vinylidene chloride, vinyl acetate, diethyl maleate, etc., or the film may be composed of vinyl chloride polymer modified by admixing therewith other resins or rubbers, such as acrylonitrile-butadiene copolymer or styrene-acrylonitrile copolymer. The vinyl film is usually plasticized, but film containing little or no plasticizer may also be used. For example, plasticizer levels ranging from 9 to 45 parts per 100 parts of resin may be used in formulating the film, depending on the physical properties desired. Frequently optimum adhesion is found to be obtained when the plasticizer content of the vinyl sheeting is about 28 parts. However, the adhesive employed in the invention is unique in that it is not as adversely affected by migration of plasticizer from the film into the adhesive, and therefore a considerably higher content of plasticizer, such as 50 or 60 parts, may be used if desired with less adverse effect. Any appropriate conventional plasticizer or mixture of plasticizers may be used, such as butyl decyl phthalate, dioctyl phthalate, tricresyl phosphate, tri-octyl phosphate, dioctyl adipate, dioctyl azelate, dioctyl sebacate, and the so-called polymeric epoxidized plasticizers. The film or sheeting formulation may include lubricants such as stearic acid, or Acrawax C (a synthetic wax melting at 140°–143° C., believed to be a mixed ester derived from fatty acids and polyhydric alcohols), etc. Fillers may also be present in conventional amounts, such as calcium carbonate, magnesium oxide, or clay. Conventional stabilizers for the vinyl film, such as lead compounds, e. g., dibasic lead stearate, or other stabilizers, may also be present.

Generally, the formulation of the film or sheeting will be as follows:

| | Parts by weight |
|---|---|
| Vinyl chloride resin | 100 |
| Plasticizers | 0–45 |
| Stabilizers | 0–10 |
| Lubricants | 0–3 |
| Inert colors, pigments or fillers | 0–50 |

The electrolytic zinc coated steel is preferably prepared for the laminating process by applying to the surface a solution of chromic oxide, to form a surface of zinc chromate thereon. The electrolytic zinc coated steel usually comes from the electro galvanizing factory with a protective coating of zinc phosphate thereon. By immersing the electrolytic zinc coated steel, having a surface of zinc phosphate, in a bath of chromic oxide solution, the zinc phosphate on the surface is converted to zinc chromate. Commercial preparations, such as American Chemical Paint Company's "Lithoform Z," suitable for this purpose are available on the market. The electrolytic zinc coated steel may then be rinsed with clear water and dried, after which it is ready for the laminating process.

The laminating process is carried out by first applying to the surface of the electrolytic zinc coated steel, the adhesive solution or dispersion described previously, based on the terpolymer of butadiene, acrylonitrile, and methacrylic acid along with the copolymer of vinyl chloride and vinyl acetate modified with a small amount of maleic acid. The adhesive may be applied by roller coating, spraying, or brushing, or any other suitable method. Specific examples of suitable adhesive compositions are as follows:

EXAMPLE 1

| | Parts by weight |
|---|---|
| Copolymer of butadiene (69.0%), acrylonitrile (26.5%) and methacrylic acid (4.5%) [Hycar 10723] | 3.81 |
| Phenol-formaldehyde resin (heat-reactive type containing hexamethylene tetramine—Durez 12687) | 0.954 |
| Copolymer of vinyl chloride (87%), vinyl acetate (12%) and maleic anhydride (1%) having a molecular weight of 10,000–15,000 (Vinylite VMCH) | 14.300 |
| Methyl ethyl ketone | 37.61 |
| Methyl isobutyl ketone | 18.51 |
| Toluene | 20.0 |
| Mercapto benzo thiazole | 0.066 |
| Carbon disulfide | 4.75 |

EXAMPLE 2

| | Parts by weight |
|---|---|
| Copolymer of butadiene (69%), acrylonitrile (26.5%) and methacrylic acid (4.5%) [Hycar 10723] | 3.8 |
| Phenol-formaldehyde resin (heat-reactive type containing hexamethylene tetramine—Durez 12687) | 1.0 |
| Copolymer of vinyl chloride (87%), vinyl acetate (12%) and maleic anhydride (1%) having a molecular weight of 10,000–15,000 (Vinylite VMCH) | 14.2 |
| Methyl ethyl ketone | 40.0 |
| Methyl isobutyl ketone | 21.0 |
| Toluene | 20.0 |

EXAMPLE 3

| | Parts by weight |
|---|---|
| Copolymer of butadiene (69.0), acrylonitrile (26.5%) and methacrylic acid (4.5%) [Hycar 10723] | 4.0 |
| Phenol-formaldehyde resin (heat-reactive type containing hexamethylene tetramine—Durez 12687) | 1.0 |
| Copolymer of vinyl chloride (87%), vinyl acetate (12%) and maleic anhydride (1%) having a molecular weight of 10,000–15,000 (Vinylite VMCH) | 15.0 |
| Methyl ethyl ketone | 40.0 |
| Methyl isobutyl ketone | 20.0–16.0 |
| Toluene | 20.0 |
| Plasticizer (any of the following alone or blended together: tricresyl phosphate, Santicizer 141, dioctyl phthalate) | 0.0–4.0 |

EXAMPLE 4

| | Parts by weight |
|---|---|
| Copolymer of butadiene (69.0%), acrylonitrile (26.5%) and methacrylic acid (4.5%) [Hycar 10723] | 5.0–10.0 |
| Copolymer of vinyl chloride (87%), vinyl acetate (12%) and maleic anhydride (1%) having a molecular weight of 10,000–15,000 (Vinylite VMCH) | 15.0–10.0 |
| Methyl ethyl ketone | 49.8–59.8 |
| Toluene | 30.0–20.0 |
| Mercapto benzo thiazole | 0.05–0.1 |
| Sulfur | 0.15–0.30 |

The adhesive of Example 1 is particularly suitable for use with vinyl resin sheeting that does not contain a lead stabilizer, where very good bonds are desired. However, it is also suitable for lead-containing formulations. The adhesive of Example 2 is recommended for bonding lead-containing vinyl film where staining from sulfur might be objectionable. The adhesive of Example 3 has the advantage of being somewhat softer and fusing at a slightly lower temperature. The adhesive of Example 4 is recommended for general applications where sulfur staining is not a problem.

The adhesive solution is usually coated onto the clean metal by either spraying or roller coating, to produce a dry film having a thickness of 1.0 mil plus or minus 0.25 mil. Alternatively, the adhesive may be applied to the vinyl chloride resin sheet, instead of, or in addition to, being applied to the prepared metal base.

The adhesive-coated metal is typically passed continuously through a heating zone, to heat it to a temperature of 200 to 450° F., and preferably 400 to 450° F., the thus preheated adhesive-coated electro galvanized steel sheet is then advanced continuously into a pair of laminating rolls, or similar device, at which point the vinyl film is brought into contact with the adhesive-coated surface, and the film and the metal are pressed firmly together, while the metal base is still hot. The vinyl film need not be preheated.

The vinyl sheet or film may be embossed previously with a desired grain or surface pattern, or such embossing may be accomplished simultaneously with the laminating operation, or subsequent thereto.

Pressures of from about 40 to 80 p. s. i. are suitably exerted by the laminating rolls during the laminating process.

The laminating may proceed with great speed, e. g. the steel base and the vinyl film may be passed through the laminating rolls at speeds of from 25 to 200 feet per minute. Long sheets or strips or coils are easily laminated by this process. Further details of the laminating technique will be found in U. S. Patent 2,728,703, referred to above.

When the adhesive composition contains sulfur or equivalent curing ingredients for the methacrylic acid terpolymer, the preheating operation will effect a partial cure of the adhesive, and the cure will continue to advance at the instant of lamination. It is believed that the cure continues to advance subsequent to the lamination. The adhesive compositions containing curatives are preferred because in general the bond provided by such adhesives retains its strength at elevated temperatures better.

After the laminate emerges from between the laminating rolls, it may either be rolled up into a coil, or it may be cut into sheets or other shapes and stacked pending further fabricating operations. In any case, no special cooling treatment is necessary. This is in direct contrast to the laminating process, using the previous conventional adhesives, wherein it has been considered necessary to chill the laminate as soon as possible after passage through the nip rolls in order to set the adhesive and prevent further flow. In so doing the plastic sheet or film used in the laminate was allowed to retain its plastic memory in the conventional process. This retention of plastic memory in the conventional process has been found to be a detriment in operations where the laminate has been subjected to cold drawing operations, especially in rectangular or square draws where the corner radii keep the plastic sheet or film under stress.

Thus, when conventionally prepared drawn articles are subjected to subsequent heat tests, such as exposure to a temperature of 190° F. for a period of 4 hours, considerable delamination frequently occurs at the corners due to the aforementioned retention of plastic memory.

With the adhesive of the invention on the other hand it is possible, and indeed highly preferable, to pile or coil the laminate in the heated state in which it leaves the laminating rolls, e. g., 150° F. to 250° F. This piling in a heated state has two effects:

(1) It provides additional cure for the rubber phase of the adhesive and provides additional bond strength.

(2) It serves to eliminate in large measure the plastic memory in the vinyl sheet (which was retained when the conventional adhesives were used) thereby alleviating any tendency to delamination after the laminate is drawn and subsequently subjected to heat. The laminate of the invention may be subjected to any of the usual forming operations conventionally carried out on sheet metal, without damage to the vinyl film on the surface of the laminate, and without damage to the adhesive bond between the film and the electrolytic zinc coated steel base. Deep draws, 180° bends, and all sorts of crimped effects and seams may be made without failure. The laminate is at once decorative and functional, being suitable for fabrication into all sorts of articles.

The strength of the adhesive bond formed between the metal base and the vinyl sheet with the present adhesive is much greater than the adhesive bond that could be obtained with previously known adhesive materials. The unusual strength of the adhesive bond is all the more remarkable in view of the fact that it has heretofore not been possible to obtain a satisfactory, permanent bond between vinyl film and zinc-coated metal. The improvement realized by the invention in this respect is demonstrated particularly when the laminate is subjected to elevated temperatures, or to aging. Thus, the laminate of the invention maintained the initial good bond between the vinyl film and the electrolytic zinc coated steel even after the laminate was immersed for ten minutes in boiling water. Similarly, aging the laminate for one hour in an oven at a temperature of 270° F. did not materially weaken the bond between the vinyl film and the electrolytic zinc coated steel. Such results as this have been heretofore impossible of attainment, insofar as the inventors are advised.

The following table shows typical adhesion values obtained between vinyl film and electrolytic zinc coated steel, in accordance with the invention, using the adhesive of Example 1, above. The table also shows, for comparison, the adhesion values obtained with a conventional adhesive, namely, the adhesive of Example 1 of U. S. Patent 2,728,703, referred to previously. The adhesion test was carried out as described in that patent. The table also shows the adhesion values obtained when bonding vinyl film to a cold rolled steel surface (not coated with zinc) and directly to an aluminum surface, with the adhesive of the invention. For comparison, the adhesion value obtained with the conventional adhesive, between cold rolled steel and vinyl film is also shown. In the case of the electrolytic zinc-coated steel, the surface was treated with chromic oxide solution, to provide a zinc chromate surface, as described previously. In the case of the cold rolled steel and the aluminum, the surface had been subjected to a conventional phosphoric acid treatment. The table gives the adhesion values on the original laminate, and also the values after immersion for ten minutes in boiling water, and also the adhesion values after aging in an oven at 270° F. for one hour.

*Adhesion test results*

| Sample No. | Base | Adhesive | Adhesion Value in Pounds | | |
|---|---|---|---|---|---|
| | | | Initial Value | Value After 10 Min. in Boiling Water | Value After Oven Aging 1 hr. at 270° F. |
| 1 | Electrolytic zinc coated steel. | Invention | ¹ 49 | ¹ 50 | ¹ 50 |
| 2 | ----do---- | ----do---- | ¹ 20 | ¹ 20 | ¹ 20 |
| 3 | ----do---- | ----do---- | ¹ 44 | ¹ 44 | ¹ 42 |
| 4 | ----do---- | ----do---- | ¹ 19 | ¹ 22 | ¹ 23 |
| 5 | ----do---- | Conventional | 16 | 3 | 6 |
| 6 | ----do---- | ----do---- | 13 | 5-7 | 5 |
| 7 | Cold Rolled Steel. | Invention | ¹ 20 | ¹ 19 | ¹ 20 |
| 8 | ----do---- | ----do---- | ¹ 20 | ¹ 20 | ¹ 20 |
| 9 | ----do---- | Conventional | ¹ 20 | ¹ 18 | ¹ 20 |
| 10 | Aluminum | Invention | ¹ 20 | ¹ 21 | ¹ 19 |

¹ Film failed before bond.

The invention therefore for the first time makes it possible to obtain and maintain a good bond between the vinyl film and the electrolytic zinc coated steel. There is immense practical advantage in thus being able to use zinc coated steel as the base metal of the laminate, since the zinc protects the base metal from corrosion, and therefore if the vinyl film should become damaged in use, unsightly rust formation is forestalled. Furthermore, there is less likelihood that the bond between the vinyl film and the metal will be destroyed due to creepage of rust which might start to form at the unprotected edges of the laminate and proceed into the body of the laminate, if the base metal were not protected by the zinc coating. Similarly, there is little chance of failure of the laminate from rusting through from the back of the laminate, when the base metal is zinc coated, and hence it is not necessary to make any special provision for corrosion protection on the reverse side of the laminate. The electrolytic zinc coated steel provides an economical, substantially permanent base, that costs very little more than plain cold rolled steel.

Perhaps one of the most important advantages of the invention lies in the fact that the electrolytic zinc coated steel eliminates many of the problems of the laminator with respect to cleaning and preparing the steel for the lamination operation. Conventional cold rolled steel usually has a greasy or oily film, necessary to prevent it from rusting after it is manufactured, and this film of oil or grease generally becomes very dirty and it is difficult to remove the oil and grease and present a fresh, clean surface for laminating. Thus, a rather complex cleaning procedure, involving some five stages, is normally employed to clean cold rolled steel, and the equipment necessary is expensive and takes up a lot of space.

In direct contrast to this, only a brief immersion of electrolytic zinc coated steel in a single chemical treating bath is necessary in preparing the present laminate. No expensive or space-consuming equipment is necessary.

While it is not desired to limit the invention to any particular theory of operation, it is believed that the good bond obtained between the vinyl film and the electrolytic zinc coated steel in the present laminate is a direct consequence of the methacrylic acid function in the butadiene-acrylonitrile-methacrylic acid terpolymer which forms one of the essential ingredients of the adhesive. It is believed that conventional bonds between vinyl film and zinc coated metal lack strength and permanence because of an unfavorable chemical action between the zinc and the chlorine-containing vinyl resin in the applied film, or in the adhesive, or both. It is possible that small amounts of hydrogen chloride are released by decomposition of the vinyl resin, either at the time when the vinyl film or adhesive are heated at the laminating operation, or upon subsequent aging or exposure to heating service. The released hydrogen chloride presumably reacts with the zinc to form a zinc chloride that is in turn a catalyst for further decomposition of the vinyl resin. Whatever the explanation, it has not heretofore been possible, as indicated previously, to provide a good, permanent bond between the vinyl film and zinc coated metal. It appears to be possible that the methacrylic acid copolymer forestalls the formation of hydrogen chloride, or reacts with any hydrogen chloride that is formed, or at least in some way forestalls the formation of the catalytic zinc salt or counteracts its catalytic action. Whatever the explanation, the observed fact is that the adhesive including the methacrylic acid terpolymer provides a good initial bond between the vinyl film and the electrolytic zinc coated metal, which bond does not deteriorate even after exposure to elevated temperatures for extended periods of time, as demonstrated by the above data. Such results are not obtainable if the methacrylic acid terpolymer is omitted from the adhesive formulation, or if some other polymer, such as a butadiene:acrylonitrile copolymer, is substituted for the methacrylic acid terpolymer in the adhesive formulation. It should also be noted that the vinyl chloride:vinyl acetate copolymer modified with a small amount of maleic anhydride is also an essential component of the adhesive, since if this ingredient is omitted, the desired results are not obtained, even if the methacrylic acid terpolymer is present.

Having thus described our invention, what we claim and desire to protect by Letters Patent is:

1. A laminate comprising an exterior film of vinyl chloride resin, an electrolytic zinc coated steel base, and an adhesive interposed between said resin film and metal base comprising (A) a rubbery terpolymer of 40–80% butadiene, 10–50% acrylonitrile and 2–25% methacrylic acid and (B) a resinous terpolymer of 5–20% vinyl acetate, 80–95% vinyl chloride, and 0.5–5% of an alpha, beta-olefinically unsaturated carboxylic acid, the proportions of (A) and (B) being 10–50 parts (A) and correspondingly 90–50 parts (B) per 100 parts of (A) and (B).

2. A laminate comprising an exterior film of vinyl chloride resin, an electrolytic zinc coated steel base, and an adhesive interposed between said resin film and zinc coated base comprising (A) a rubbery terpolymer of 40–80% butadiene, 10–50% acrylonitrile, 2–25% methacrylic acid and (B) a resinous terpolymer of 5–20% vinyl acetate, 80–95% vinyl chloride, and 0.5–5% maleic acid, the proportions of (A) and (B) being 10–50 parts (A) and correspondingly 90–50 parts (B) per 100 parts of (A) and (B), the said laminate being characterized by the ability to retain a good bond between said film and base even after exposure to elevated temperatures.

3. A laminate as in claim 2, in which the said adhesive contains 2–10% of a phenol-formaldehyde resin, based on the total solids content of the adhesive, the said adhesive being cured.

4. A laminate as in claim 2, in which the said electrolytic zinc is surfaced with zinc chromate.

5. A method of laminating a preformed film of polyvinyl chloride resin to an electrolytic zinc coated metal base comprising in combination the steps of contacting said metal base with a chromic oxide solution to form a surface of zinc chromate thereon, applying to such surface an adhesive composition comprising (A) a rubbery terpolymer of 40–80% butadiene, 10–50% acrylonitrile, 2–25% methacrylic acid and (B) a resinous terpolymer of 5–20% vinyl acetate, 80–95% vinyl chloride, and 0.5–5% maleic acid, the proportions of (A) and (B) being 10–50 parts (A) and correspondingly 90–50 parts (B) per 100 parts of (A) and (B), heating the adhesive-coated base to a temperature of 200–400° F., and applying said preformed resin film to the heated adhesive-coated base by passing the resin film and the base through the nip of a pair of laminating rolls, whereby the resin film and the metal base become firmly bonded together.

References Cited in the file of this patent

UNITED STATES PATENTS

| | | |
|---|---|---|
| 2,329,456 | Campbell | Sept. 14, 1943 |
| 2,395,017 | Semon | Feb. 19, 1946 |
| 2,459,739 | Groten et al. | Jan. 18, 1949 |
| 2,653,884 | Hussey et al. | Sept. 29, 1953 |
| 2,724,707 | Brown | Nov. 22, 1955 |
| 2,728,703 | Kiernan et al. | Dec. 27, 1955 |